Aug. 16, 1960 — S. F. SOUCIE ET AL — 2,949,160
CLEANING AND CONVEYING UNIT FOR BEET HARVESTER
Filed Dec. 18, 1958 — 2 Sheets-Sheet 1

INVENTORS
SYLVESTER F. SOUCIE
ALEXANDER J. BAUER
BY
McGrew and Edwards
ATTORNEYS Aug. 16, 1960  S. F. SOUCIE ET AL  2,949,160
CLEANING AND CONVEYING UNIT FOR BEET HARVESTER
Filed Dec. 18, 1958  2 Sheets-Sheet 2

INVENTORS
SYLVESTER F. SOUCIE
ALEXANDER J. BAUER
BY
*M<sup>c</sup>Grew and Edwards*
ATTORNEYS United States Patent Office 2,949,160
Patented Aug. 16, 1960

2,949,160

CLEANING AND CONVEYING UNIT FOR BEET HARVESTER

Sylvester F. Soucie, Rte. 3, Box 145, and Alexander J. Bauer, Rte. 1, both of Longmont, Colo.

Filed Dec. 18, 1958, Ser. No. 781,260

9 Claims. (Cl. 171—101)

Our invention relates to harvester apparatus and more particularly to row crop harvesters, such as are used for the harvesting of sugar beets, for example.

In the growing of row crops, such as sugar beets, the entire operation from soil preparation, through planting and cultivation to harvesting is becoming mechanized to avoid the unavailability and high cost of manual labor.

Mechanical harvesters are used to top the beets, lift them from the row, gather them and elevate them into transport vehicles. Means are provided to separate the beets from beet tops, clods and other foreign matter in conjunction with the gathering and elevating operations, but in general, such means are not very effective and a considerable amount of debris collects in the elevator conveyor, impairing its efficiency, and also deposits in the transport vehicle into which the beets are discharged, necessitating later separation and resulting in an added haulage cost.

It is an object of our invention to provide simple, durable and efficient means for separating beets from associated foreign matter in a mechanical harvesting operation.

Another object of our invention is to provide simple, durable and efficient apparatus for harvesting beets or similar row crops.

Other objects reside in novel details of construction and novel combinations and arrangements of parts, all of which will be described in the course of the following description.

The practice of the present invention will be best understood by reference to the accompanying drawings, in the several views of which like parts bear similar reference numerals. In the drawings.

Figure 1:
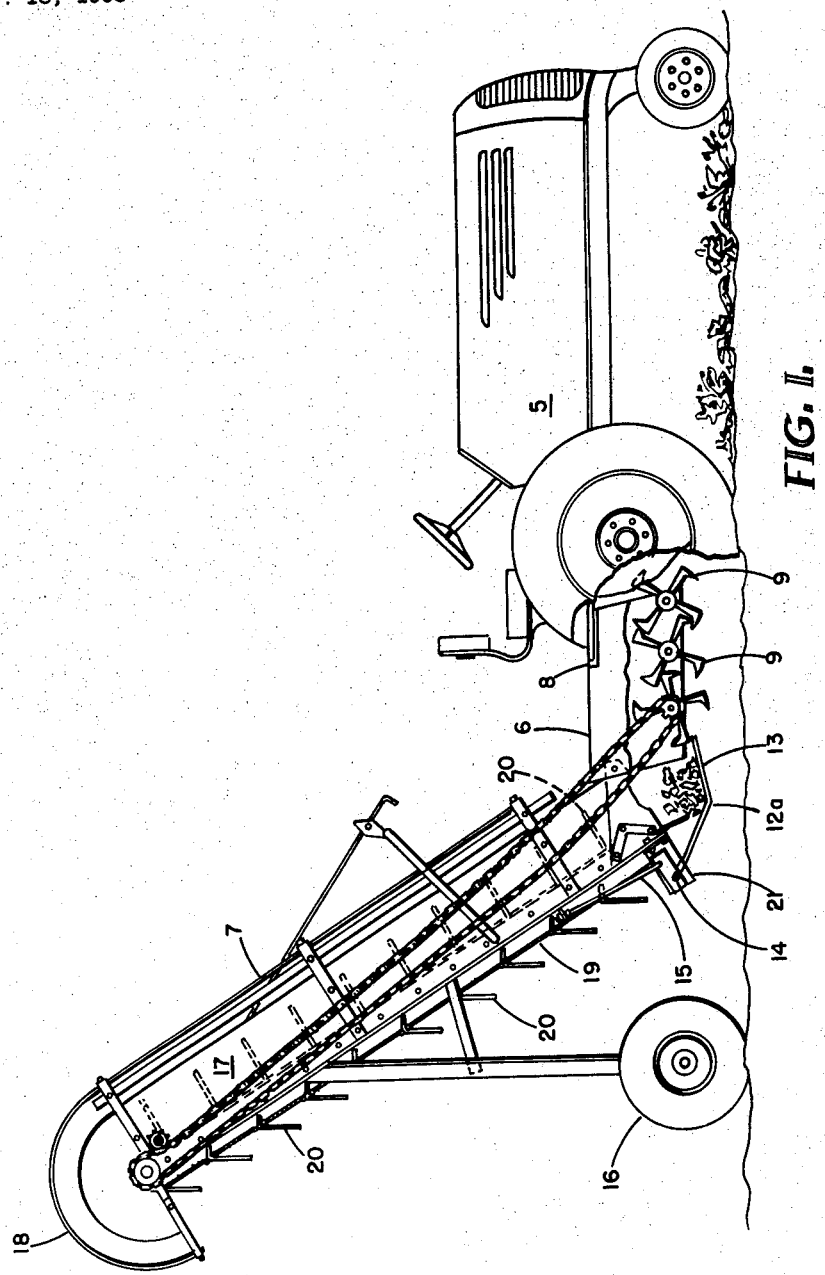
Fig. 1 is a side elevation of harvesting apparatus utilizing features of our invention, and partially broken to show the arrangement of interior parts.

Referring to Fig. 1, the harvester mechanism is connected to and drawn by a tractor 5 or other propulsion unit and comprises a forward section 6 and a discharge section 7. The forward section includes a frame 8 mounted on the draw bar of tractor 5 in a depending position, and plow blades (not shown) are supported at the forward end of the frame and a series of kicker wheels 9 are arranged in rows rearwardly of the plow blades, with the wheels of a given row spaced laterally of the frame 8 and extending into the spaces 10 between adjoining times 12 of a grizzly 13.

Figure 2:
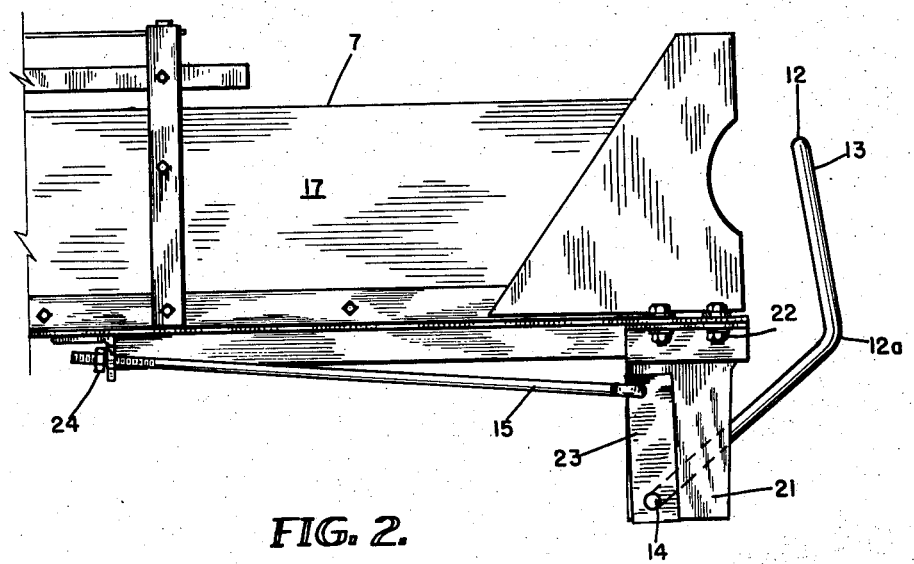
Fig. 2 is a fragmentary side elevation of the mounting arrangement of hinged grizzly on the elevating conveyor.

The grizzly 13 is mounted at the lower end of discharge section 7 and preferably is pivoted on said section as shown at 14 in Fig. 2 and adjustably held by a rod 15 so as to permit selective positioning relative to the surface over which the harvester is moved. The discharge section 7 is supported above the crop row by wheels 16 with an inclined chute portion 17 having at its top a curved baffle 18 which directs the top discharge in a vertical fall. An endless conveyor 19 carrying a series of hinged flights 20 arranged at intervals throughout its length to hold the beets fed across grizzly 13 during their elevating movement through chute 17 to said top discharge.

Figure 3:
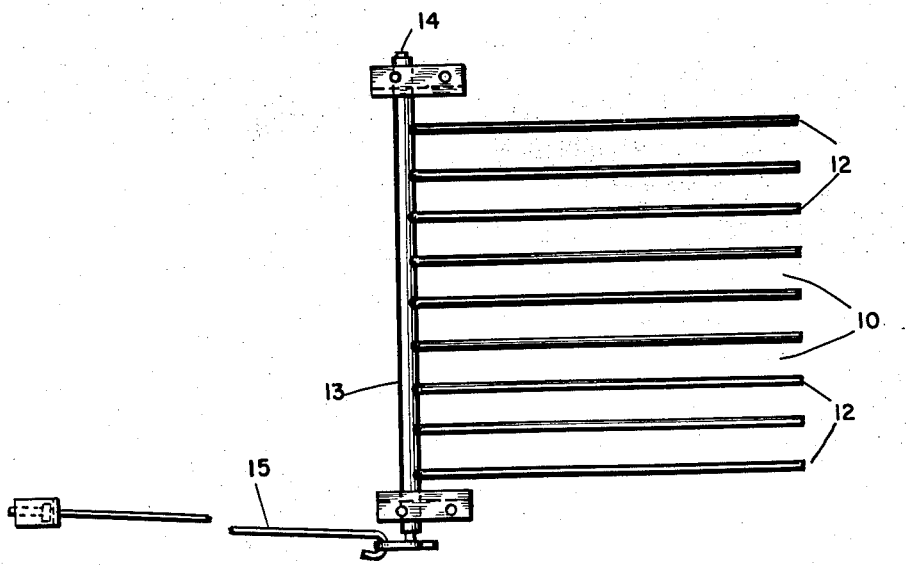
Fig. 3 is a top plan view of the grizzly unit shown in Fig. 2.

As shown in Figs. 1 and 2, tines 12 of grizzly 13 are bent intermediate their ends so that they incline upwardly from the bend 12a toward their ends when in the operation position illustrated in Fig. 1. In addition, the tines are spaced to extend into the spaces between the kicker wheels 9; in Fig. 3, the kicker wheels would be in the spaces generally indicated by reference characters 10 and are in such proximity to adjoining tines that the beets deposited onto their upper surfaces will slide or be pushed down the inclined supporting surfaces until contacted by the conveyor flights 20.

The suspended position of grizzly 13 permits clods, leaves and other debris to fall by gravity, while the harvested beets are of a size which does not permit them to descend between the tines. Consequently, the matter reaching the flights 20 consists mostly of beets with very little associated foreign matter present. The kickers 9 elevate the beets as they convey them rearwardly and much of the leaves, clods and other foreign matter separates during such movement, or are reduced in size in such movement, so that upon reaching grizzly 13 they readily separate from the beets by falling through the spaces between the tines, while the beets are held on the tines and move progressively thereon until they reach the course of movement of flights 20, which hold them during elevating movement through chute 17.

In a preferred arrangement, the pivots 14 are supported on plates 21 fixedly held on the under surface of chute 17 by bolts 22 or other suitable fastenings, and another plate or link 23 is fixed on pivot 14 adjacent its lower end and is connected at its upper end with the threaded rod 15, which may be moved by turning nut 24 to rotate link 13 and pivot 14 on plate 21. This movement provides a selective elevation of the outer ends of tines 13.

The grizzly 13 may be an attachment to beet harvester equipment of conventional types in which case the link 23, rod 15 and nut 24 may comprise a part of the attachment assembly, or may be incorporated as part of a complete harvester assembly. While the pivoting feature is of considerable advantage in certain types of operations, it is not essential under all conditions, and the practice of the present invention utilizes both types of operations.

Certain features of the elevator mounting and operational control have been illustrated in the drawings, but as they comprise no part of the present invention, detailed description appears unnecessary.

We claim:

1. In a harvester for beets or the like, a forward section having means for lifting a rooted row crop from the row in which it is grown after topping of the leaves from the roots, and having means for conveying said roots rearwardly in an elevated position separate from the tops, a rearward section distant from said conveying means including elevating means for moving said roots to an upper point of discharge, and a pivotally-mounted grizzly inclusive of a plurality of tines disposed with its tines disposed to substantially fill the space between said conveying means and said elevating means for separating roots from associated matter in the passage of said roots from said forward section to said rearward section, and means for selectively elevating the outer ends of the tines so as to selectively position the grizzly relative to the ground over which the harvester passes.

2. In a harvester for beets or the like, a forward section having means for lifting a rooted row crop from the row in which it is grown after topping the leaves from the roots, and having means for conveying said roots rearwardly in an elevated position separate from the tops, a rearward section distant from said conveying means including elevating means for moving said roots to an upper point of discharge, a pivotally-mounted grizzly inclusive of a plurality of tines disposed with its bars disposed to substantially fill the space between said conveying means and said elevating means for separating roots from associated matter in the passage of said roots from said forward section to said rearward section, and means for selectively moving said grizzly about its pivot to thereby effect a selective position thereof relative to the ground over which the harvester passes.

3. In a harvester for beets or the like, a forward section having means for lifting a rooted row crop from the row in which it is grown after topping of the leaves from the roots, and having means for conveying said roots rearwardly in an elevated position separate from the tops, a rearward section distant from said conveying means including elevating means for moving said roots to an upper point of discharge, and a grizzly inclusive of a plurality of parallel tines disposed with its bars disposed to substantially fill the space between said conveying means and said elevating means for separating roots from associated matter in the passage of said roots from said forward section to said rearward section, the tines of said grizzly inclining upwardly toward their respective ends whereby the roots move downwardly along the grizzly until they are contacted by said elevating means, and means for selectively elevating the outer ends of the tines so as to selectively position the grizzly relative to the ground over which the harvester passes.

4. In a harvester for beets or the like, a forward section having means for lifting a rooted row crop from the row in which it is grown after topping of the leaves from the roots, and having means for conveying said roots rearwardly in an elevated position separate from the tops, a rearward section distant from said conveying means including elevating means for moving said roots to an upper point of discharge, and a grizzly inclusive of a plurality of parallel tines disposed with its bars disposed to substantially fill the space between said conveying means and said elevating means for separating roots from associated matter in the passage of said roots from said forward section to said rearward section, the bars of said grizzly inclining upwardly toward their forward ends whereby the roots move downwardly along the grizzly until they are contacted by said elevating means, and means for selectively elevating the outer ends of the tines so as to selectively position the grizzly relative to the ground over which the harvester passes.

5. In a harvester for beets or the like, a forward section having means for lifting a rooted row crop from the row in which it is grown after topping of the leaves from the roots, and having a plurality of rows of kicker wheels for conveying said roots rearwardly in an elevated position separate from the tops, a rearward section distant from said conveying means including elevating means for moving said roots to an upper point of discharge, and a grizzly inclusive of a plurality of parallel tines disposed with its bars disposed to substantially fill the space between said conveying means and the kicker wheels with the forward ends of the bars of the grizzly disposed in the space between the kicker wheels of the rearward row for separating roots from associated matter in the passage of said roots to said rearward section, and means for selectively elevating the outer ends of the tines so as to selectively position the grizzly relative to the ground over which the harvester passes.

6. In a harvester for beets or the like, a forward section having means for lifting a rooted row crop from the row in which it is grown after topping the leaves from the roots, and having means for conveying said roots rearwardly in an elevated position separate from the tops, a rearward section distant from said conveying means including elevating means for moving said roots to an upper point of discharge, and a pivotally mounted grizzly inclusive of a plurality of tines disposed with its tines disposed to substantially fill the space between said conveying means and said elevating means for separating roots from associated matter in the passage of said roots from said forward section to said rearward section, and the forward ends of the tines of said grizzly being positioned at approximately the elevation of the lowermost position of said elevating means, and means for selectively elevating the outer ends of the tines so as to selectively position the grizzly relative to the ground over which the harvester passes.

7. In a harvester for beets or the like, a forward section having means for lifting a rooted row crop from the row in which it is grown after topping the leaves from the roots, and having means for conveying said roots rearwardly in an elevated position separate from the tops, a rearward section distant from said conveying means including elevating means for moving said roots to an upper point of discharge, and a pivotally mounted grizzly inclusive of a plurality of parallel tines disposed with its tines disposed to substantially fill the space between said conveying means and said elevating means for separating roots from associated matter in the passage of said roots from said associated matter in the passage of said roots from said forward section to said rearward section, the forward ends of the tines of said grizzly being positioned at approximately the elevation of the lowermost position of said elevating means and an intermediate of said tines being disposed at a point lower than the forward and rearward ends of said tines such that roots will move by gravity into contact with the elevating means, and means for selectively elevating the outer ends of the tines so as to selectively position the grizzly relative to the ground over which the harvester passes.

8. The apparatus of claim 7 in which the side configuration of the tines is generally that of an upwardly opening obtuse angle with its apex disposed substantially central of the pivot point of said grizzly and the end of said grizzly near the elevating means.

9. In a harvester for beets or the like, a forward section having means for lifting a rooted row crop from the row in which it is grown after topping off the leaves from the roots, and having means for conveying said roots rearwardly in an elevated position separate from the tops, a rearward section distant from said conveying means of the forward section, inclusive of elevating means for moving said roots to an elevated discharge point, a tined grizzly pivotally mounted on said rearward section with its tines positioned to substantially fill the space between the forward section and the rearward section, and means for selectively elevating the outer ends of the tines for selective positioning of the grizzly relative to the ground over which the harvester passes, said tines being of an upwardly opening obtuse angular configuration such that roots are induced to slide by gravity from the conveying means to the elevating section while supported on said tines.

References Cited in the file of this patent

UNITED STATES PATENTS

| 1,249,445 | Meader | Dec. 11, 1917 |
| 1,634,172 | Carrick | June 28, 1927 |
| 2,624,997 | Orendorff | Jan. 13, 1953 |